Figure 1:
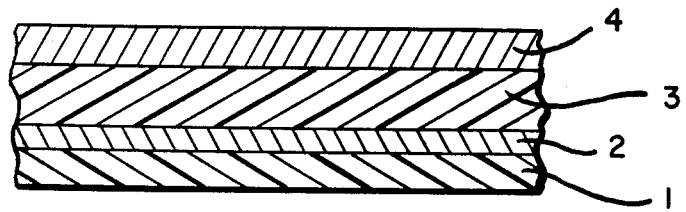

United States Patent [19]

Giglia et al.

[11] 4,193,670
[45] Mar. 18, 1980

[54] ELECTROCHROMIC DEVICES HAVING PROTECTIVE INTERLAYERS

[75] Inventors: Robert D. Giglia, Rye, N.Y.; Richard H. Clasen, West Redding, Conn.

[73] Assignee: American Cyanamid Company, Stamford, Conn.

[21] Appl. No.: 849,387

[22] Filed: Nov. 8, 1977

[51] Int. Cl.[2] .............................................. G02F 1/17
[52] U.S. Cl. .................................................... 350/357
[58] Field of Search ......................................... 350/357

[56] References Cited

U.S. PATENT DOCUMENTS

| | | |
|---|---|---|
| 3,971,624 | 7/1976 | Bruesch et al. ........................ 350/357 |
| 3,981,560 | 9/1976 | Heyman et al. ....................... 350/357 |
| 4,004,849 | 1/1977 | Shattuck ................................ 350/357 |
| 4,116,546 | 9/1978 | Leibowitz .............................. 350/357 |
| 4,120,568 | 10/1978 | Deb et al. .............................. 350/357 |

*Primary Examiner*—James W. Davie
*Attorney, Agent, or Firm*—Bruce F. Jacobs; Gordon L. Hart

[57] ABSTRACT

The incorporation of one or more protective layers between the electrochromic material and the polymeric electrolyte in an electrochromic device produces longer lasting, more uniform devices. The further placing of a protective layer between the electrolyte and the counterelectrode yields still better devices.

18 Claims, 4 Drawing Figures

ELECTROCHROMIC DEVICES HAVING PROTECTIVE INTERLAYERS

The invention relates to improvements in electro-optical devices which contain a layer of persistent electrochromic material on one electrode in contact with a specific family of polymeric electrolytes which is also in contact with a counterelectrode within the device. The improvements involve placing one or more protective layers between the electrolyte and the electrochromic material and, optionally, between the electrolyte and the counterelectrode. Electrochromic devices operate by passing an electric current between the electrodes, through the electrochromic material, to change the photoabsorptive characteristics of said material so as to darken or lighten it. Such devices are provided with means both for applying the electric field to the device and for reversing the electric field.

A variety of such devices having numerous uses have been described in the prior art. U.S. Pat. No. 3,708,220, for example, describes electrochromic devices in which a particular gelled electrolyte solution is used.

U.S. Pat. No. 3,521,941, discloses the potential use of plastics, e.g. polyesters, vinyl or like polymers, allylic or like polymers, polycarbonates, phenolics, amino resins, polyamides, polyimides, and cellulosic resins for electrochromic devices.

U.S. Pat. No. 3,971,624 discloses the use of a perfluorated sulfonic acid polymer as an electrolyte for electrochromic devices, though there is no disclosure of how to incorporate such a polymer into a device.

The present invention incorporates one or more protective layers between the electrochromic material and the polymeric electrolyte. The protective layers are either (1) an ion permeable insulator or (2) a non-electrochromic version of the electrochromic material plus the insulator with the insulator being in intimate contact with the electrolyte. Further improvement results from putting a second protective ion permeable insulator layer on the other side of the electrolyte. When the counterelectrode is gold still further improvement results from putting a thin palladium layer atop the second insulator layer and adjacent to the counterelectrode.

The incorporation of the protective layer or layers yields an electrochromic device which is more stable than previous devices having polymeric electrolytes.

It is thus an object of this invention to produce a device which has a longer life than was possible by prior devices.

Figure 2:
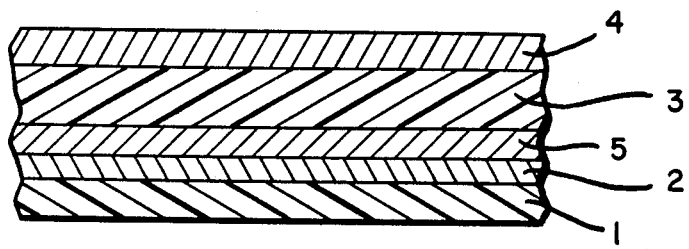
Figure 3:
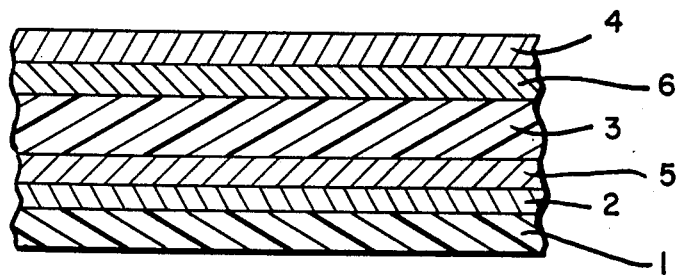
Figure 4:
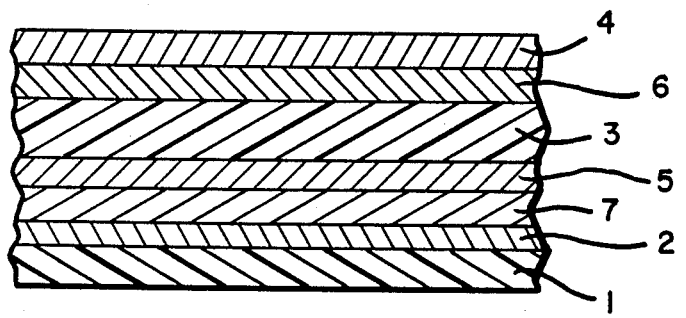

The foregoing and other features, objects and advantages of the present invention will become more apparent from the following detailed description thereof taken in conjunction with the accompanying drawings in which:

FIGS. 1–4 are each cross-sectional views of the various layers making up an electrochromic device, wherein FIG. 1 represents the prior art and FIGS. 2–4 represent alternative embodiments of the present invention.

FIG. 1 illustrates a prior art electrochromic device which is built by starting with a front electrode 1 having an electrode layer deposited upon a clear glass or plastic material. Then a layer of electrochromic material 2 is deposited upon the electrode. Next a layer of polymeric electrolyte 3 is incorporated, and finally the counterelectrode 4.

FIG. 2 illustrates the incorporation of a protective layer of an insulator 5 between the electrochromic layer 2 and the polymeric electrolyte 3.

FIG. 3 illustrates the incorporation of two protective insulator layers 5 and 6 on either side of the polymeric electrolyte 3. The two insulator layers may be either the same or different materials, but preferably are the same.

FIG. 4 illustrates the incorporation of three protective layers. There is a layer of non-electrochromic material 7 atop the electrochromic layer 2; then a layer of an insulator 5; and finally a second layer of an insulator 6 atop the polymeric electrolyte 3.

As used herein, a "persistent electrochromic material" is defined as a material responsive to the application of an electric field of a given polarity to change from a first persistent state in which it is essentially non-absorptive of electromagnetic radiation in a given wave length region, to a second persistent state in which it is absorptive of electromagnetic radiation in the given wave length region, and once in said second state, is responsive to the application of an electric field of the opposite polarity to return to its first state. Certain of such materials can also be responsive to a short circuiting condition, in the absence of an electric field, so as to return to the initial state.

By "persistent" is meant the ability of the material to remain, after removal of the electric field, in the absorptive state to which it is changed, as distinguished from a substantially instantaneous reversion to the initial state, as in the case of the Franz-Keldysh effect.

The materials which form the electrochromic materials of the device in general are electrical insulators or semiconductors. Thus are excluded those metals, metal alloys, and other metal-containing compounds which are relatively good electrical conductors.

The persistent electrochromic materials are further characterized as inorganic substances which are solid under the conditions of use, whether as pure elements, alloys, or chemical compounds, containing at least one element of variable oxidation state, that is, at least one element of the Periodic System which can exist in more than one oxidation state in addition to zero. The term "oxidation state" as employed herein is defined in "Inorganic Chemistry", T. Moeller, John Wiley & Sons, Inc., New York, 1952.

These include materials containing a transition metal element (including Lanthanide and Actinide series elements), and materials containing non-alkali metal elements such as copper. Preferred materials of this class are films of transition metal compounds in which the transition metal may exist in any oxidation state from $+2$ to $+8$. Examples of these are: transition metal oxides, transition metal oxysulfides, transition metal halides, selenides, tellurides, chromates, molybdates, tungstates, vanadates, niobates, tantalates, titanates, stannates, and the like. Particularly preferred are films of metal stannates, oxides and sulfides of the metals of Groups (IV)B, (V)B and (VI)B of the Periodic System, and Lanthanide series metal oxides and sulfides. Examples of such are copper stannate, tungsten oxide, cerium oxide, cobalt tungstate, metal molybdates, metal titanates, metal niobates, and the like.

Additional examples of such compounds are as disclosed in U.S. Pat. No. 3,521,941 incorporated herein by reference.

While the exact mechanism of persistent electrochromism is unknown, the coloration is observed to occur at the negatively charged electrochromic layer. Generally, the phenomenon of persistent electrochromism is believed to involve transport of cations such as hydrogen or lithium ions to the negative electrode where color centers form in the electrochromic image layer as a result of charge compensating electron flow.

When the persistent electrochromic materials are employed as films, thickness desirably will be in the range of from about 0.1-100 microns. However, since a small potential will provide an enormous field strength across very thin films, the latter, i.e., 0.1-10 microns, are preferred over thicker ones. Optimum thickness will also be determined by the nature of the particular compound being laid down as a film and by the film-forming method, since the particular compound and film-forming method may place physical (e.g., non-uniform film surface) and economic limitations on manufacture of the devices.

When tungsten oxide is employed as the electrochromic imaging material and an electric field is applied between the electrodes, a blue coloration of the previously colorless electrochromic layer occurs, i.e., the persistent electrochromic layer becomes absorptive of electromagnetic radiation over a band initially encompassing the red end of the visible spectrum, thereby rendering the imaging layer blue in appearance. Prior to the application of the electric field, the electrochromic imaging layer is essentially non-absorbent and thus colorless.

The electrodes used herein may be any material which, relative to the electrochromic film, is electrically conducting. These electrically conductive materials are generally coated on a suitable substrate material such as glass, wood, paper, plastics, plaster and the like, including transparent, translucent, opaque or other optical quality materials. At least one of the electrode-substrate combinations is transparent, though both may be.

Suitable polymers for use as the electrolytes herein are those of U.S. Pat. No. 3,521,941 as well as any other electrically conducting polymers. Preferably the polymers are polymers and copolymers containing acidic or basic groups or salts thereof. These groups are generally covalently bonded to the polymer chain. Most preferably the polymers with acidic or basic groups are soluble.

The acid type polymers exchange cations while the basic polymers exchange anions. The main groups of cation exchangers of the strong acid type are $-SO_3H$ and $-PO_3H_2$, while those of the weak type are $-COOH$. An example of the strong basic type is $-CH_2N(CH_3)_3OH$ and an example of the weak basic type is $>NH_2OH$. Among these four types, sulfonic acid and quarternary ammonium hydroxide contain strongly ionized functions and, consequently, have high ionic conductivity resulting from migration of $H^+$ or $OH^-$ ions. The nature of the ionic group greatly affects the ionic conductivity of the ion exchange polymers. The most conductive polymers are those in which the mobile ion is a proton. The functional group $-SO_3H$ should consequently be preferred to its salts, such as $-SO_3Na$, or to weak acids, such as $-COOH$. The extent of sulfonation will also have an effect on the ionic conductivity of the polymer.

Examples of polymeric electrolytes include such as: polystyrene sulfonic acid, polyethylene sulfonic acid, and perfluorated sulfonic acid (Nafion ®).

The polymeric electrolytes may be incorporated into the electrochromic device by dissolving the polymer in a suitable solvent, depositing the polymer on the layer below in the device, and evaporating the solvent to produce a solid film of polymeric electrolyte. The electrolyte preferably has a thickness of about 10,000 Å to 100,000 Å or more, the optimum level varying with the type of polymer, the number and type of the various protective layers, as well as the use to which the device is put. A more complete description of depositing the polymer is disclosed and claimed in copending U.S. Ser. No. 841,630 filed Oct. 13, 1977, of Robert D. Giglia, incorporated herein by reference.

The protective layer or layers, when they are insulators, are used in intimate contact with the polymeric electrolyte and are believed to provide an electronic insulation of the polymeric electrolyte while still maintaining ionic conduction or permeability from and between the adjacent electronically conductive layers of the device. Suitable materials for the insulating layers, which may be the same or different though preferably the same, include silicon oxide, calcium fluoride, and magnesium fluoride. Also included are other metal oxides or sulfides prepared by oxidizing or sulfiding a metal surface so that the insulator is formed directly in the device. Examples include the above materials as well as aluminum oxide and other inorganic insulators, such as selenide, arsenide, nitride, chloride, fluoride, bromide, and carbide materials.

The insulator layers must be thick enough to offer the requisite electronic insulation, but not so thick as to impair the ionic permeability and/or conduction. Generally, thicknesses of about 100 to 1500 Angstroms are usable. The preferred thickness varies depending upon the actual insulator used. For silicon oxide, the preferred thickness is about 350-450 Angstroms; for magnesium fluoride, about 200-300 Angstroms. As the thickness increases above the preferred ranges, the speed of switching is reduced if the driving voltage is held constant.

When only one insulator protective layer is used, it should be placed between the polymeric electrolyte and the electrochromic film layer to minimize unwanted reactions between the polymer and the film.

When the protective layer, between the electrochromic material and the electrolyte further contains a non-electrochromic layer of the same material as the electrochromic material it is put in intimate contact with the electrochromic layer. The material is deemed non-electrochromic in that it does not color under the influence of an electric field in an essentially dry (less than about 5% water) device under normal electrochromic operating voltages. The non-electrochromic layer is essentially a more highly oxidized version of the same material which serves as the electrochromic material. It may be prepared by vacuum depositing the material at a slower rate than the electrochromic layer and in an oxidizing atmosphere, as opposed to a reducing or neutral atmosphere. While any of the materials which may be used for the electrochromic layer may also be used for the non-electrochromic layer, preferably tungstic oxide is used for both.

When a gold counterelectrode is used in the present devices which have insulating layers on both sides of the polymeric electrolyte, the incorporation of a very thin "nucleating" layer between the insulator layer and the gold counterelectrode results in a still more improved device. Suitable nucleating layer materials include palladium, platinum, and rhodium. Preferably, palladium is used due to its protonic conduction characteristics.

The devices of the present invention may be conveniently built by depositing one layer upon the other until the desired structure is created.

The following specific examples are given to illustrate the invention further and to show specific embodiments and modes of practice of the invention and are not intended to be limitative.

EXAMPLE 1

An electrochromic device was prepared as follows:

A 500 Angstrom layer of electrochromic tungstic oxide was deposited on a sheet of indium oxide conductive glass. Atop the electrochromic layer, 400 Angstroms of silicon oxide (almost completely $SiO_2$) was deposited by thermal evaporation in an $O_2$ environment. Then 0.07 gms polystyrene sulfonic acid (PSSA) polymer was dissolved in 1.0 ml of methanol so that the polymeric electrolyte could be incorporated in the device. 25,000 Angstroms of PSSA was deposited by a spin coating technique. A 120 Angstrom layer of gold was deposited upon the dry polymer layer and used as the counter-electrode.

A second device was prepared in the same manner as the first except omitting the silicon oxide layer.

The two devices were tested by alternately coloring and clearing the devices at DC potentials of about 2 volts to color and 1 volt to clear. A 15 second coloration time produced about 20% transmission of light over a 14 cm. area. Upon reversing the potential for 15 seconds the transmission increased to 55%. A cycle of switching includes one coloring period and one clearing period.

The two devices gave the following comparative results:

|  | Silicon Oxide | No Silicon Oxide |
|---|---|---|
| Cycle Life | 240[1] | 10[2] |

[1]Failure due to development of residual absorption in clear state.
[2]Failure due to excessive erase charge necessary to return device to clear state.

EXAMPLE 2

The procedure for the preparation of the first device of Example 1 was repeated except that a second 400 Angstrom layer of silicon oxide was deposited atop the polymeric electrolyte before the counterelectrode was incorporated.

The device was tested as in Example 1 with the following results:

|  | Two Silicon Oxide Layers |
|---|---|
| Cycle Life | 5,000 cycles[3] |

[3]Failure due to loss of conductivity in counter-electrode.

EXAMPLE 3

The procedure of Example 2 was repeated except that a non-electrochromic layer of tungstic oxide was incorporated between the electrochromic layer and the first silicon oxide layer. The non-electrochromic layer was deposited at $1.7 \times 10^{-4}$ torr, using an $O_2$ bleed, at a rate of 3 Å/sec. to a thickness of about 650 Å.

The device was tested as in Example 1 and gave the following results:

|  | Non-Electrochromic Layer plus Two Silicon Oxide Layers |
|---|---|
| Cycle life | 7,000 cycles[4] |

[4]Failure due to loss of conductivity in counter-electrode.

EXAMPLE 4

The procedure of Example 1 was repeated except that magnesium fluoride (250 Å) was used in place of the silicon oxide.

|  | |
|---|---|
| Cycle life | 200 cycles[5] |

[5]Failure due to development of residual absorption in clear state.

What is claimed is:

1. In an electrochromic device which comprises an electrode and a counterelectrode and disposed therebetween a layer of persistent electrochromic material and an ion-conductive, electrically insulating layer of polymeric electrolyte material, said layers disposed in said device for reversible ionic conduction across the layers between said electrode and counterelectrode whereby said persistent electrochromic layer is changeable between colored and clear states, the improvement comprising a first electrically insulating film layer of an inorganic compound of thickness in the range from about 100 to 1500 Angstroms, thick enough for electronic insulation, but not so thick as to impair ionic conduction across the thickness of said film, contacting the surface of said layer of electrolyte material nearest said electrochromic layer.

2. An improved device defined by claim 1 wherein a second said insulating film layer is disposed in said device contacting the side of said electrolyte material opposite said first film layer.

3. The device of claim 2 wherein the counterelectrode is gold and contacts said second insulating film layer on its side opposite the electrolyte layer.

4. The device of claim 3 except further containing a nucleating layer selected from palladium, platinum and rhodium between said second insulating film layer and said gold counterelectrode.

5. The device of claim 4 wherein the nucleating layer is palladium.

6. The device of claim 4 wherein each insulating film layer is of a compound selected from the group consisting of silicon oxide, calcium fluoride and magnesium fluoride.

7. The device of claim 4 wherein each insulating film layer is silicon oxide.

8. The device of claim 4 wherein the polymer contains acidic groups or salts thereof.

9. The device of claim 8 wherein the polymer is soluble.

10. The device of claim 8 wherein the acidic groups are sulfonic acid groups.

11. The device of claim 1 wherein the persistent electrochromic material is tungstic oxide.

12. An improved device defined by claim 1 further comprising a non-electrochromic layer of material the same as said electrochromic material except in a higher oxidation state and hence non-electrochromic, disposed in said device contacting said electrochromic layer nearest said first film layer.

13. An improved device defined by claim 1 wherein said polymeric electrolyte material is polystyrene sulfonic acid polymer.

14. The device of claim 1 wherein the defined insulating film layer is a compound selected from the group consisting of silicon oxide, calcium fluoride, and magnesium fluoride.

15. The device of claim 14 wherein the selected compound is silicon oxide.

16. The device of claim 1 wherein the polymeric electrolyte material is a polymer having acidic groups or salts thereof.

17. The device of claim 16 wherein the acidic groups are sulfonic acid groups.

18. The device of claim 16 wherein the polymer is soluble.

* * * * *